United States Patent [19]
Benson

[11] Patent Number: 5,122,902
[45] Date of Patent: Jun. 16, 1992

[54] RETROREFLECTIVE ARTICLES HAVING LIGHT-TRANSMISSIVE SURFACES

[75] Inventor: Gerald M. Benson, Woodbury, Minn.

[73] Assignee: Minnesota Mining and Manufacturing Company, St. Paul, Minn.

[21] Appl. No.: 331,689

[22] Filed: Mar. 31, 1989

[51] Int. Cl.⁵ ............................................. G02B 5/122
[52] U.S. Cl. .................................... 359/529; 359/530
[58] Field of Search .............. 350/102, 103, 109, 286, 350/105; 362/29; 40/205, 208, 564

[56] References Cited

U.S. PATENT DOCUMENTS

| | | | |
|---|---|---|---|
| 2,818,500 | 12/1957 | Franck | 240/106 |
| 3,005,382 | 10/1961 | Weber | 88/82 |
| 3,712,706 | 1/1973 | Stamm | 359/530 |
| 3,779,629 | 12/1973 | Green | 359/530 |
| 3,790,431 | 2/1974 | Tung | 359/536 |
| 3,833,285 | 9/1974 | Heenan | 359/530 |
| 3,924,929 | 12/1975 | Holmen et al. | 359/530 |
| 4,005,538 | 2/1977 | Tung | 40/132 R |
| 4,025,159 | 5/1977 | McGrath | 359/536 |
| 4,073,568 | 2/1978 | Heasley | 359/530 |
| 4,208,090 | 6/1980 | Heenan | 359/530 |
| 4,243,618 | 1/1981 | Van Arnam | 264/1 |
| 4,349,598 | 9/1982 | White | 428/161 |
| 4,588,258 | 5/1986 | Hoopman | 359/530 |
| 4,672,089 | 6/1987 | Pricone et al. | 524/354 |
| 4,775,219 | 10/1988 | Appledorn et al. | 359/530 |

FOREIGN PATENT DOCUMENTS 225123 6/1987 European Pat. Off.
2386059 10/1978 France.

OTHER PUBLICATIONS

"Transflectors Take Off at U.S. Airports".

Primary Examiner—Loha Ben
Attorney, Agent, or Firm—Gary L. Griswold; Carolyn A. Bates; Peter Forrest

[57] ABSTRACT

Retroreflective elements, such as cube-corner elements or right triangular prisms containing cube-corners, are arranged on articles to define separation surfaces between the elements; in another embodiment, the elements are truncated cube-corners incorporating similar surfaces on the elements themselves. If the surfaces are transparent they will transmit light through the article, rendering it partially transparent and partially retroreflective. The surfaces may be flat or curved. Standard grooving techniques may be employed to construct the elements, using mold cutting tools having flattened or curved tips instead of V-shaped tips; alternatively, electroformed molds may be lapped to include the shape required to produce surfaces. The elements and surfaces may be embodied in sheeting materials or internally illuminated signs.

16 Claims, 4 Drawing Sheets

RETROREFLECTIVE ARTICLES HAVING LIGHT-TRANSMISSIVE SURFACES

TECHNICAL FIELD

This invention relates to retroreflective articles having prismatic retroreflective elements and light transmissive surfaces.

BACKGROUND

Many types of retroreflective elements are known, including prismatic designs incorporating one or more "cube-corners." Generally, the prismatic elements are closely packed together when they are assembled into articles or sheeting, with no non-retroreflective portion between the elements. This close packing improves retroreflective performance by increasing the number of retroreflective elements per unit area of article or sheeting.

However, in some cases the close packing of the prismatic elements is not desired. For example, U.S. Pat. No. 4,775,219 (Appeldorn et al.), at column 7 lines 20–33, suggests that flat surfaces may be included between the prismatic elements disclosed in the patent so as to, for example, allow light from an automobile tail lamp to be directly transmitted through a retroreflective tail light reflector. This patent also indicates that "other structure" may be included between the intersection of the grooves that form the prismatic elements, but does not describe any examples. The prismatic elements in the patent are characterized by being formed by sets of intersecting V-shaped grooves, at least one set of grooves having groove side angles that are not constant for that set. The groove side angle is the angle between the groove side and a plane extending parallel to the length of the groove and perpendicular to the plane defined by the bottom edges of the three intersecting sets of V-shaped grooves Similarly, U.S. Pat. No. 4,588,258 (Hoopman), at column 6, line 53 to column 7, line 21, discloses a cube-corner design in which non-retroreflective areas between the cube-corner elements may be provided by separating the elements from each other The separation of elements is one way to avoid removal of some edges of the cube-corner elements by a grooving tool used to construct the elements. Light may pass through these non-retroreflective areas, if a transparent or translucent article or sheeting base is used.

U.S. Pat. No. 3,924,929 (Holmen et al.) is representative of cube-corner designs in which non-retroreflective areas between cube-corner elements are provided and defined by what are designated as "free edges of septa." The septa are portions of the cube-corner material that have edges raised above, i.e. "free" from, the retroreflective portions of the material. At column 4, lines 38–54, and as shown in FIG. 3, Holmen et al. teach that the septa must be displaced away from the bases of the cube-corner elements, toward the trihedral corners, by a distance greater than the perpendicular elevation of the corners above the bases. Then, when a backing layer is attached to the septa at the free edges, an air space fully surrounding the cube-corner elements is created between the backing layer and those elements. At column 3, line 44 to column 4, line 2, they teach that the area of contact between an individual septum and the backing layer must be large enough to form a good bond, but the total area of all the septa must not unduly affect the overall retroreflective performance of the article. Again, light may pass through the non-retroreflective septa if they are made from a transparent or translucent material.

DISCLOSURE OF INVENTION

The invention is a partially retroreflective article comprising prismatic retroreflective elements. In some embodiments, the base edges of the lateral faces of adjacent elements define separation surfaces between the bases of the elements. In other embodiments, a portion of an element is removed to define truncated surfaces on the elements. Either type of surface may have a flat or curved cross section. Several types of prismatic elements may be used, and specularly reflecting coatings on the elements or the surfaces may be added. The invention may be embodied in a polymeric sheet having on one side an array of prismatic retroreflective elements and separation or truncated surfaces. The invention may also be embodied in internally illuminated signs.

DETAILED DESCRIPTION

Figure 1A:
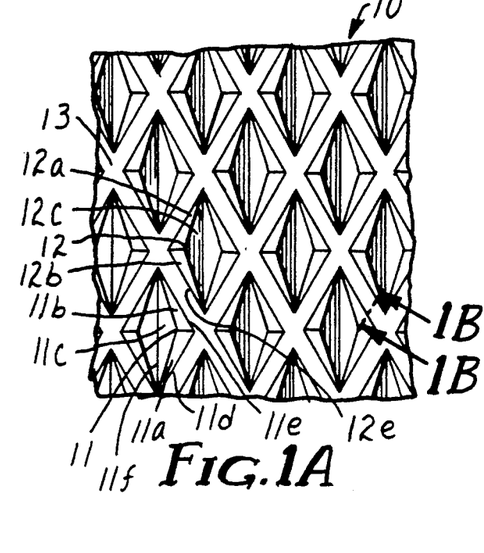
FIG. 1A is a front view of one embodiment of the invention.
Figure 1B:
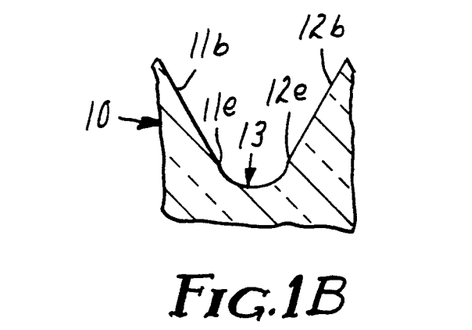
FIG. 1B is a cross section taken along section line 1B—1B of FIG. 1A.

FIGS. 1A and 1B are front and cross sectional views, respectively, of retroreflective article 10. Article 10 comprises several cube-corner elements, of which the elements identified at their corners as 11 and 12 are typical. Element 11 has three triangular lateral faces 11a, 11b, and 11c; and similarly element 12 has faces 12a, 12b, and 12c. Each lateral face has a base edge, e.g., lateral face 11a has base edge 11d. The base of an element is the area enclosed by the three base edges, e.g., the triangle formed by base edges 11d, 11e, and 11f. The bases of elements 11 and 12 are substantially equilateral triangles, as taught in U.S. Pat. No. 3,712,706 (Stamm). Such an element is also known as a "60-60-60" element in reference to the included angles of the base.

FIG. 1B is a cross sectional view taken across a groove of article 10, i.e., the view looking down the length of the groove. If the cube-corner elements were packed together as closely as possible, the lateral faces 11b and 12b would meet at a common base edge, or in other words, base edges 11e and 12e would coincide. But in this invention, the retroreflective article 10 has a separation surface 13, defined for this embodiment as the region lying in the groove between the bases of the elements and bounded by the non-coincident base edges 11e and 12e.

In some embodiments of the invention, the separation surface is flat and thus the cross section taken across the groove (perpendicular to the groove length) is a straight line. Or the separation surface 13 could be curved, and thus the cross section taken across the groove would be a curved line, as in the embodiment shown in FIGS. 1A and 1B. Furthermore, in the embodiment of FIGS. 1A and 1B separation surface 13 is concave (curved away from the apexes of the cube-corner elements), and semi-circular. However, these features of this embodiment are illustrative only. Retroreflective articles comprising convex separation surfaces are possible embodiments of the invention, as are articles having separation surfaces in which the cross sections are portions of any smooth curve, not just a portion of a circle.

Figure 1C:
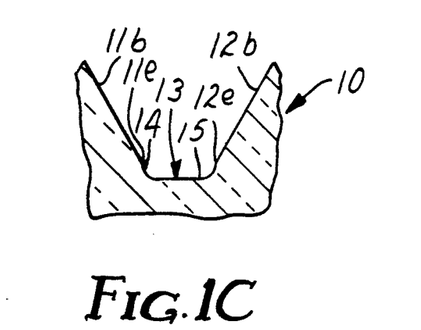
FIG. 1C is a cross section of an embodiment of the invention similar to that of FIG. 1B.

Furthermore, surfaces having mixed cross sections, comprising both straight and curved portions, could be used. For example, separation surface 13 of FIG. 1C comprises a flat portion 15 between two curved portions 14. In this specification and the claims, unless specifically noted to the contrary, any surface described as having a "flat" or "curved" cross section includes a surface having a mixed cross section comprising a flat or curved portion. Also, the particular cross section of a surface need not be constant at every point of the surface, e.g., at every location along the groove, but could vary smoothly or discontinuously from point to point, e.g., down a groove.

In articles having more than one separation surface, the cross sections of the surfaces may differ from each other in size or cross section, and need not even be the same type. For example, a flat surface may exist across one groove, a surface having a mixed cross section across another groove, and a curved cross section across a third groove.

The invention does not require the use of the 60-60-60 cube-corner elements taught by Stamm. Articles comprising any prismatic retroreflective elements may be used if they are located on an article having separation surfaces as described above. Such elements include those in which the base edges of the lateral faces of the elements substantially form an isosceles triangle in which the unpaired angle measures less than the paired angles. For example, an element could have included angles of substantially 65 degrees, 65 degrees, and 50 degrees.

Or, the lateral faces of the elements may substantially form an isosceles triangle in which the unpaired angle measures more than the paired angles. An example is taught by U.S. Pat. No. 4,588,258 (Hoopman), specifically an element having included base angles of 70 degrees, 55 degrees, and 55 degrees. The Hoopman elements are elements that are rotated 180° with respect to one another; the three lateral faces of each element are mutually perpendicular and defined at their bases by linear edges that lie in a common plane; and the optical axes of each element of the pair are tilted towards one edge of that element. The optical axis of an element is the trisector of the internal space defined by the faces and base of the element.

The concept of a transparent surface in a retroreflective article is not limited to embodiments having separation surfaces at the bottoms of grooves between the retroreflective elements. For example, the embodiment of FIGS. 2A and 2B, a modification of the "full cube-corner" design, has non-retroreflective surfaces incorporated directly into the retroreflective elements formed in the article.

Figure 2A:
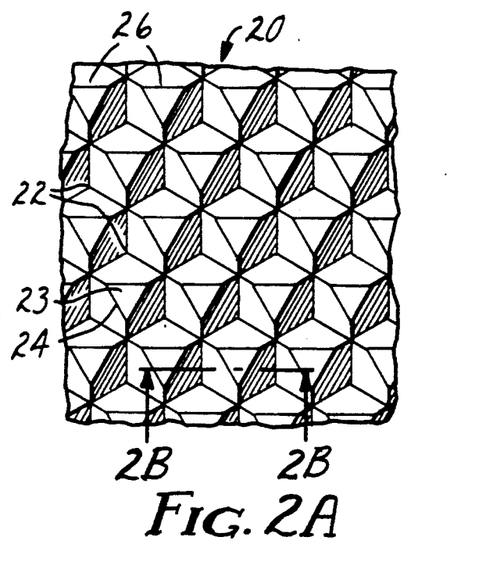
FIG. 2A is a front view of a second embodiment of the invention.
Figure 2B:
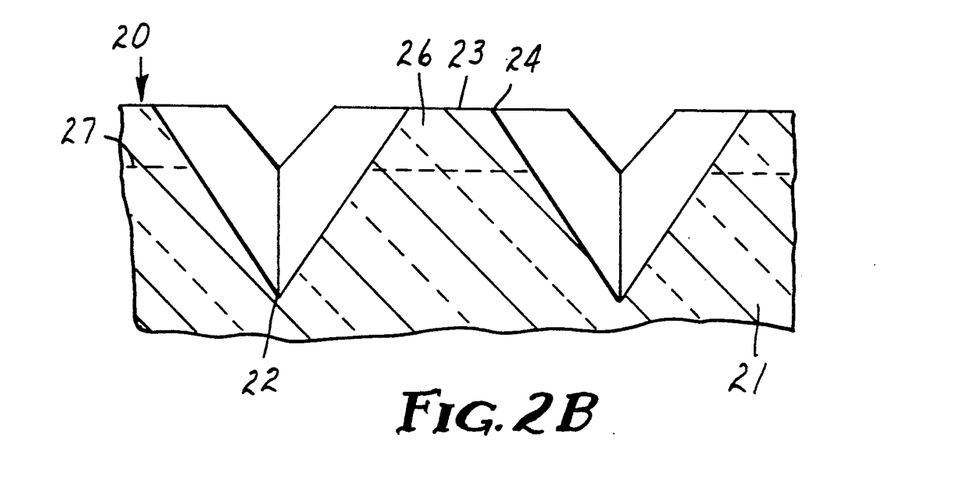
FIG. 2B is a cross section taken along line 2B—2B of FIG. 2A.

In the embodiment of FIGS. 2A and 2B, the uppermost parts of some trihedral corners are missing from article 20, producing truncated full-cube corner elements 26. The imaginary diagonal plane 27 indicates the plane halfway between lower trihedral corners 22 and the (removed) upper trihedral corners. Truncated surfaces 23 lie above imaginary diagonal plane 27 but below the former location of the removed corners. Truncated surfaces 23 are bounded by the elevated edges 24 of truncated full cube corner elements 26. Truncated surfaces 23 may lie at any perpendicular distance above imaginary diagonal plane 27, but no farther than the missing trihedral corners. Truncated surfaces 23 may also lie below imaginary diagonal plane 27, but no farther than lower trihedral corners 22.

The orientation relative to the imaginary diagonal plane 27 may be reversed, i.e., the unmodified trihedral corners 22 may be above imaginary diagonal plane 27 and truncated surfaces 23 below it. In general, the term "elevated edges" means those edges of a truncated full cube-corner element that are displaced from the imaginary diagonal plane in the direction of the missing cube-corner.

This embodiment removes retroreflective portions of the truncated full cube-corner elements, but in samples of the invention prepared in this manner the remaining portions of the elements provided sufficient retroreflectivity for many applications.

Figure 3A:
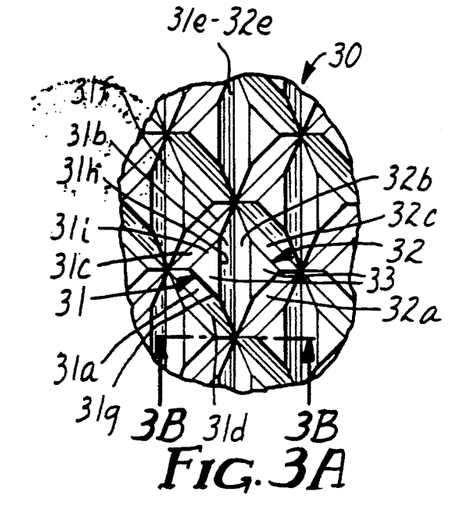
FIG. 3A is a front view of a third embodiment of the invention.
Figure 3B:
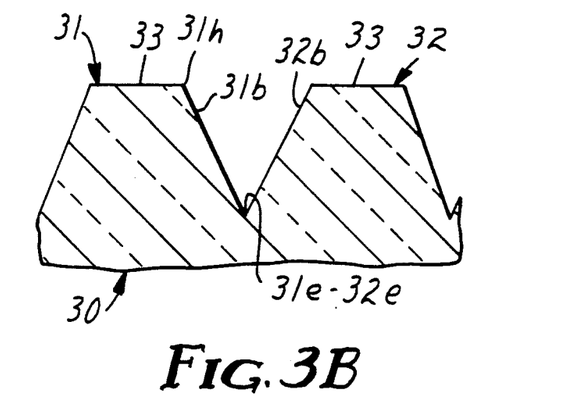
FIG. 3B is a cross section taken along section line 3B—3B of FIG. 3A.

The concept of partial removal of retroreflective elements is not limited to the full cube-corner embodiment. FIGS. 3A and 3B are front and cross sectional views, respectively, of retroreflective article 30. Article 30 comprises several cube-corner elements according to U.S. Pat. No. 4,588,258 (Hoopman), of which the elements identified as 31 and 32 are typical. Element 31 has three lateral faces 31a, 31b, and 31c; and similarly element 32 has faces 32a, 32b, and 32c. Each lateral face has a base edge and an elevated edge, e.g., lateral face 31b has base edge 31e and elevated edge 31g. Because the cube-corner elements are packed together as closely as possible, the lateral faces 31b and 32b meet at a common base edge 31e-32e.

In any embodiment incorporating partial removal of cube-corner elements, a retroreflective element is formed by three mutually perpendicular lateral faces from which a cube-corner and adjacent portions of each lateral face are missing. Thus, the retroreflective element is a truncated cube-corner. For example, in the embodiments of FIGS. 3A and 3B, each element has a truncated surface 33 located above the base of the element but below the location where the cube-corner would be if the latter were present Truncated surface 33 lies above the three base edges 31d-e-f and is bounded by the three elevated edges 31g-h-i of element 31.

In the embodiment shown in FIGS. 3A and 3B, the truncated surface is flat and a triangle because it is parallel to the base of the element, and the base is also a triangle. Thus, the retroreflective element is a frustrum of a triangular pyramid. In general, however, the truncated surface need not be flat, and even if so it need not be parallel to the base of the element. Also, the shape of the truncated surface will vary with the particular element chosen. However, if the truncated surface is flat and parallel to the base of the element it will always be equiangular to the base, but smaller in area.

Any of the cube-corner elements having triangular bases suitable for the embodiments of FIGS. 1A and 2A are also suitable for the embodiments of FIGS. 3A and 3B, including the 60-60-60 design. For the high angularity element taught in U.S. Pat. No. 4,588,258 (Hoopman), the definition of the optical axis of an element is modified to: the trisector of the internal space that would be defined by the faces and base of the element if the faces were extended to form a cube-corner element. If the truncated surface is flat and parallel to the base of the element, i.e., a frustrum of the element, this modified definition of optical axis is equivalent to: the trisector of the internal space defined by the faces, base, and truncated surface of the element. For purposes of defining an element as taught by Hoopman, the direction of the optical axis is not intended to be changed by the creation of the truncated surface or the modified definition of optical axis.

In a manner similar to the previous embodiments, truncated surfaces having mixed cross sections, comprising both straight and curved portions, could be used, and the particular cross section of a truncated surface need not be constant at every point of the surface.

Figure 4A:
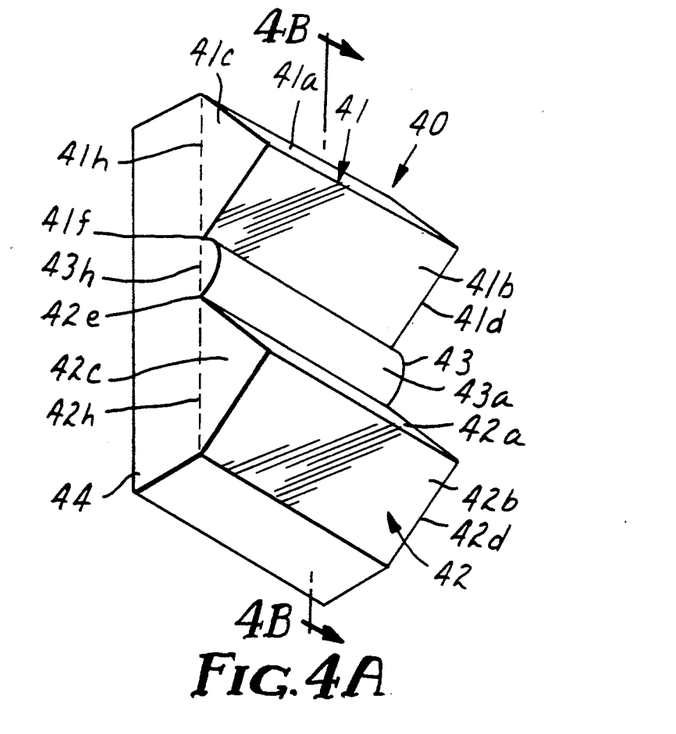
FIG. 4A is a perspective view of a fourth embodiment of the invention.

FIG. 4A is a perspective view of another embodiment of the invention, a retroreflective article 40 comprising the high-incidence angle retroreflective elements taught by U.S. Pat. No. 4,349,598 (White). Article 40 comprises two right triangular prism elements 41 and 42 on each side of a right semi-circular cylinder element 43, all positioned on transparent layer 44 at the locations of broken lines 41$h$, 42$h$, and 43$h$. Element 41 comprises two mutually perpendicular rectangular lateral faces 41$a$ and 41$b$, and two parallel right isosceles triangular end faces 41$c$ and 41$d$ mutually perpendicular to the rectangular lateral faces. Thus, the faces 41$a$–$d$ of element 41 define a pair of cube-corners, one on each end of element 41. Similarly, element 42 comprises two mutually perpendicular rectangular lateral faces 42$a$ and 42$b$, and two parallel isosceles right triangular end faces 42$c$ and 42$d$; faces 42$a$–$d$ define another pair of cube-corners.

Each of the several lateral faces has a base edge, e.g., lateral face 41$b$ has base edge 41$f$. In the inventive element, base edges 41$f$ and 42$e$ of lateral faces 41$b$ and 42$a$, respectively, define the edges of separation surface 43$a$. While each of the end faces has an end edge, e.g., end face 41$c$ has end edge 41$b$, the end edges do not contribute to the definition of separation surface 43$a$.

Figure 4B:
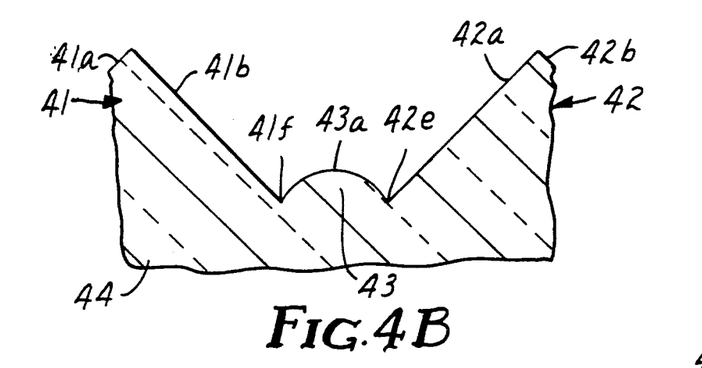
FIG. 4B is a cross section taken along section line 4B—4B of FIG. 4A.

As shown in FIGS. 4A and 4B, separation surface 43$a$ has a non-zero curvature, and is convex, i.e., curved away from transparent layer 44. In general, separation surface 43$a$ may be any smooth curve or it may be a straight line (i.e., a flat separation surface); embodiments having concave separation surfaces are also possible. Furthermore, in the construction shown in FIG. 4, the prism elements 41 and 42, the semi-cylindrical element 43, and the transparent layer 44 have the same refractive index, which in practice is achieved by a one-piece construction in which broken lines 41$h$, 42$h$, and 43$h$ are not visible. This construction is preferred as it simplifies the design and production of the article, but it is not necessary.

A variation on the retroreflective article of FIG. 4A uses retroreflective elements that are right triangular prisms, but the right triangular end faces are not isosceles triangles. A second variation, employed alone or with the first variation, involves slightly modifying the angles between the rectangular faces by 3° or less, so that the rectangular faces are "approximately" (including exactly) mutually perpendicular; and also modifying the angles between the end faces by 3° or less so that the end faces are "approximately" (including exactly) parallel to each other (and thus "approximately" perpendicular to the rectangular faces). Each of these variations is taught in the copending U.S. application Ser. No. 07/197,107, entitled, HIGH EFFICIENCY CUBE CORNER RETROREFLECTIVE MATERIAL, filed May 20, 1988, now U.S. Pat. No. 4,938,563 issued Jul. 3, 1990, which is assigned to the present assignee and incorporated by reference into this disclosure. Either or both of these variations may be employed with the separation surfaces of the present invention, by using the techniques taught in the copending application to produce retroreflective elements that are substantially (including exactly) right triangular prisms, and additionally incorporating the separation surfaces typified by the embodiment of FIG. 4A.

As in other embodiments of the invention, separation surfaces having mixed cross sections, comprising both straight and curved portions, could be used, and the particular cross section of a separation surface need not be constant at every point of the separation surface.

The preferred process for manufacture of the invention uses a diamond-tipped grooving tool. Generally, one or more sets of parallel grooves are directly cut into a flat plate to produce either a finished article, or a pattern master suitable for repeated production of identical articles. For mass production, grooves may be cut into a metal master plate, from which electroformed metal stampers may be made and repeatedly used to emboss the pattern formed by the grooves. Thus, an array of separation surfaces and retroreflective elements may be created in any article or master by using a grooving tool having a flat or curved tip and straight sides. Depending on the design of the prismatic elements and separation surfaces chosen, the grooves cut at different angles from a reference direction may vary in depth, included angle, distance between adjacent grooves, or curvature, in order to form the specific element desired.

Another suitable production method is creating V-shaped ridges (i.e., inverted V-shaped grooves) in an electroformed metal stamper produced from a metal master plate, and then removing the pointed portion of the ridges, leaving a flat or curved surface as desired. Mechanical abrasion or chemical etching is satisfactory for this purpose, although curved surfaces in particular may be difficult to create by these methods. The modified stamper is then used for embossing the pattern as before.

Molds for full cube-corner elements are manufactured by pressing the pattern into a metal plate with one or more sets of sharply pointed pins. Molds for the embodiments of this invention based on full cube-corner elements may be made by incorporating the separation surfaces into the pin set design directly, and pressing the mold accordingly. Alternately, an electroformed metal stamper having full cube-corner elements may be lapped or ground to produce separation surfaces in the mold.

Once the mold is produced by whatever method, the pattern of retroreflective elements and surfaces (separation or truncated as appropriate) may be impressed into articles, or a large area side of flexible polymeric sheeting.

Previously existing articles may have, as artifacts of the particular manufacturing process used to construct the article, non-retroreflective regions between retroreflective elements. For example, diamond-tipped grooving tools may have a flat tip to minimize tool wear. Or, in processes employing metal plates which have been impressed with one or more sets of sharply pointed pins, it may be desirable to provide some non-retroreflective regions between retroreflective elements to prevent damage to the pins.

Suitable materials for articles or sheeting of this invention include materials such as glass, acrylics, polycarbonates, polyethylene-based ionomer polymers, polyesters, cellulose acetate butyrate polymers, and polyurethanes. Polycarbonates are generally preferred for their durability and impact resistance, such as would be desirable in a vehicle tail light. The material must be transparent. For these purposes, a "transparent" material transmits at least 70 percent of the intensity of the light incident upon it at a given wavelength. The transparency of the materials ensures that the separation or truncated surfaces will transmit light through those portions of the article. Because the entire retroreflectivity of the article is not eliminated by the incorporation of separation or truncated surfaces, the use of transparent materials renders the entire article partially transparent.

In fully retroreflective articles, materials having high indices of refraction are preferred, so as to increase the difference between the indices of the material and air, thus increasing retroreflection. Because the articles of the present invention are only partially retroreflective, however, and low indices of refraction of the article will improve the range of light transmitted through the article, it may be desirable to use low refractive index materials, depending on the application. For example, in internally illuminated sign applications where a retroreflective sheeting is protected by the sign enclosure, the increased transmission range of acrylics (refractive index about 1.5) over the durability of polycarbonates (refractive index about 1.6) would be preferred.

To improve optical performance, the faces of the retroreflective elements may be specularly reflective, typically achieved by applying an appropriate coating such as aluminum or silver. In lieu of specular reflectors, some retroreflective designs rely on the index of refraction differential between the material of the cube-corner elements and air. In such designs, primarily air should contact the retroreflective elements. Techniques to create hermetically sealed "cells" of elements formed in a flexible retroreflective sheeting are taught in, for example, U.S. Pat. No. 4,025,159 (McGrath), and may be employed with the invention.

For inflexible molded articles, such as a vehicle tail light, sealing of the entire article at the edges is suitable, and can be accomplished by incorporating into the article a sealing surface which extends well above the retroreflective elements, similar to the septa taught in U.S. Pat. No. 3,924,929 (Holmen et al.). As the size of the retroreflective elements decreases, the very type of septa taught by Holmen et al. is preferred over edge sealing of the entire article.

Figure 4C:
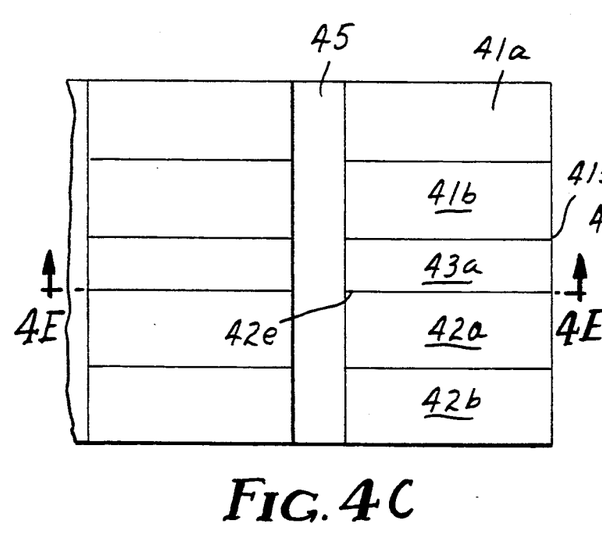
FIG. 4C is a plan view of an article incorporating the embodiment of FIG. 4A.
Figure 4D:
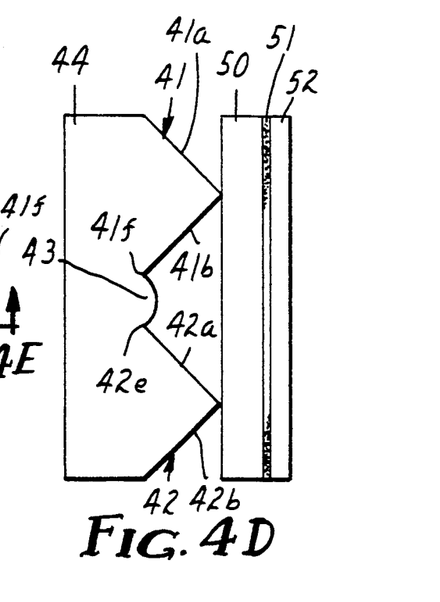
FIG. 4D is a side elevation of the article of FIG. 4C.
Figure 4E:
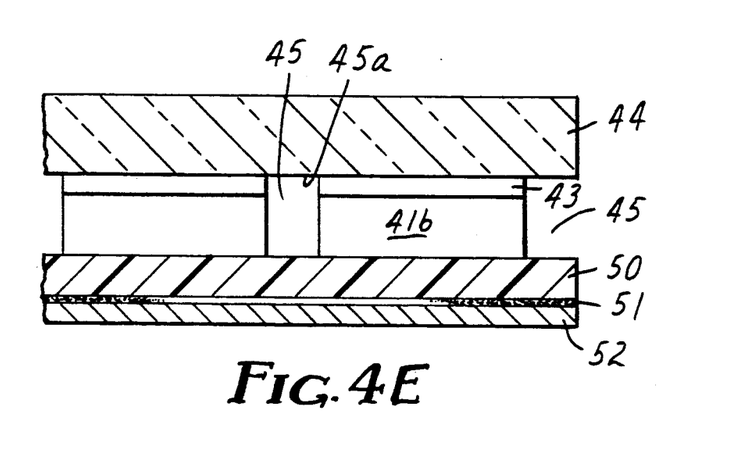
FIG. 4E is a vertical cross section taken along section line 4E—4E of FIG. 4C.

For the high-incidence angle elements of FIGS. 4A and 4B, air contact is maintained by assembling the elements with channels between the triangular end faces, and sealing the front and back sides of the elements, as taught in U.S. Pat. No. 4,349,598 (White). This approach may be applied to the inventive elements with no modification, as shown in FIGS. 4C, 4D, and 4E. The inventive elements are shown between transparent layer 44 and backing layer 50. Suitable materials for backing layer 50 are any transparent or opaque (including colored or non-colored) materials which can provide an effective seal with the materials used for the retroreflective elements. Useful materials include both organic and inorganic materials such as glass and plastics. Preferably, the materials are thermoplastic and have good weathering ability. Acrylic plastics are particularly desirable, and if additional toughness is required a polycarbonate or polybutyrate plastic is useful.

If desired, the sealed retroreflective article may be adhered to a supporting surface with adhesive 51, which may be protected before use with release liner 52 as appropriate.

The boundaries of channels 45, such as 45a of FIG. 4E, should not be confused with separation surfaces, as channels 45 lie on those portions of layer 44 that are between triangular end faces 41c and 41d of adjacent elements 41, and not between the edges defined by the lateral faces of the prismatic elements, as described above.

Any embodiment of the invention, especially the sheeting versions of the embodiments of FIGS. 1A-C, 2A-B, and 3A-B, is useful as a partially transparent retroreflective component of an internally illuminated sign. Internally illuminated signs present an image to the viewer which generally is more easily observed at night than non-illuminated or externally illuminated signs. Internally illuminated signs are commonly used in outdoor advertising and are also useful as traffic signs.

Figure 5:
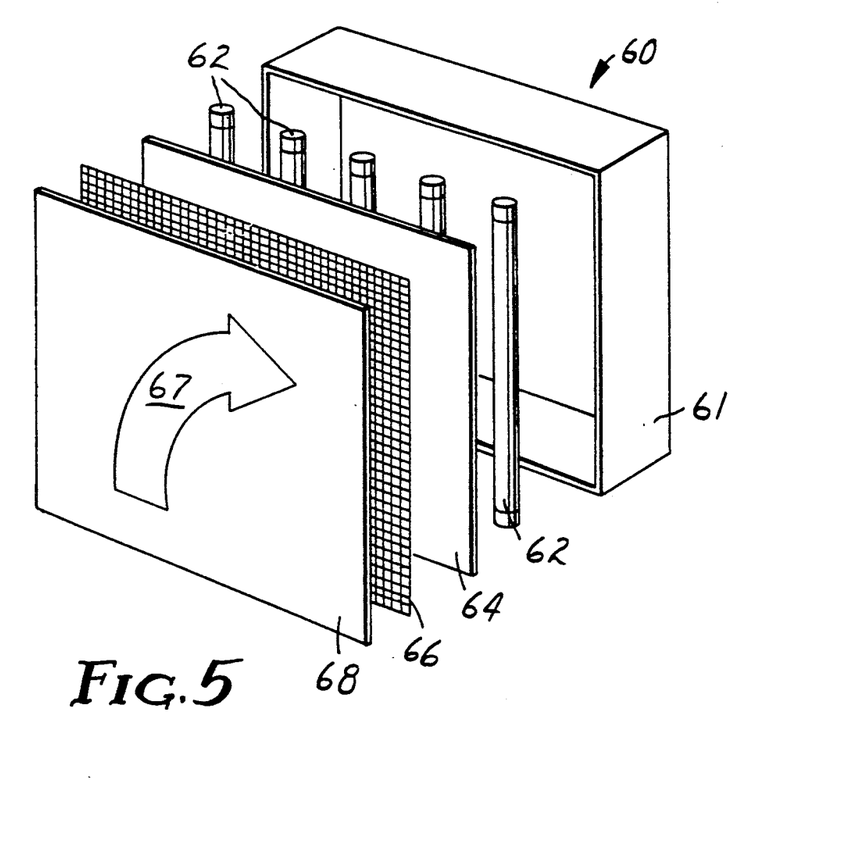
FIG. 5 is an exploded schematic view of an internally illuminated sign embodiment of this invention.

FIG. 5 shows an exploded schematic view of an internally illuminated sign 60, comprising an enclosure 61, a source of internal illumination (in this embodiment a set of tubular light bulbs) 62, a diffuser 64, retroreflective sheeting 66, and a transparent sign face 68. In this embodiment, the transparent sign face 68 is carrying a graphic 67. A "graphic" is a textual or symbolic display of information, such as a traffic symbol.

Because the sheetings of the present invention are partially transparent and partially retroreflective, the graphic is visible from the front side of the sign by means of either internal illumination, retroreflected light, or both. Uniform illumination of the graphic against the background, to improve the legibility of the graphic, is preferred. With the retroreflective sheetings of the present invention, one means for controlling the contrast of the graphic against the background is to assemble the sheeting such that the separation or truncated surfaces are in a regular arrangement. The regularity of the pattern of surfaces helps produce even illumination of the graphic by the internal illumination source.

The sign may have one or more internal light sources 62, or the source of internal illumination may be external to the enclosure, with the light introduced into the interior of the enclosure through one or more entrances by a light conduit. Light conduits, also known as light guides or light pipes, transmit light from an illumination source along the longitudinal axis of the conduit without an extensive decrease in the intensity of light leaving the conduit at the end opposite the illumination source.

The diffuser 64 is not necessary but is preferred so that light traveling through the sign face 68 is substantially uniform over the whole area of the front side or graphic 67.

The graphic 67 may be positioned on the face of the sign using means presently known in the art. For example, the graphic may comprise regions of a thin layer of colored, light-transmissive ink bonded to a transparent plate at the exterior face of the sign, between the retroreflective material and the viewer. White light passing though the ink from behind the graphic either directly from the interior of the sign, or after retroreflection, will present a colored image to the viewer. It is also possible to bond the light-transmissive ink directly to the retroreflective sheeting 66, eliminating the sign face 68.

EXAMPLE I

Using a 0.026 inch (0.660 mm) radius diamond tool, convex separation surfaces were produced by machining the surface of a polycarbonate molding made from an electroformed mold of the wide angularity cube-corner elements taught in U.S. Pat. No. 4,588,258 (Hoopman). These elements were formed by three sets of intersecting grooves, each set of grooves having a groove side angle that was constant for that set. The grooves of one set had an included angle of 88° 51' and the grooves of each of the two remaining sets had an included angle of 36° 36'. The grooves of the former set intersected the grooves of the latter two sets at an angle of 55° while the grooves of the latter two sets intersected each other at an angle of 70°. Thus, the included angles of the triangular base of the element were 70°, 55° and 55°. The runs varied in the amount of the total measured area of the machined stamper surfaces. In control Run No. 2, 0% of the measured area was turned; in Run No. 16, 20% of the measured area was turned; in Run No. 17, 60%; and in Run No. 18, 80%.

Measurements of light intensity transmitted through articles produced from the stampers (i.e., light transmitted from the nonretroreflective "back" of the article to the retroreflective "front") were made. The measurements were converted to light transmission values normalized to 100, i.e., a value of 100 represents no article in place, and a value of 0 represents no transmission through the article.

The line of light transmission from the source to the intersection point on the article and the line normal to the article at the intersection point form an angle known as the entrance angle. The line of light transmission from the intersection point on the article to the observer and the line normal to the article at the intersection point form an angle known as the observation angle. In accordance with standard procedures in the art, a reported entrance angle of 0° signifies an actual entrance angle of −4.0°; other reported entrance angles represent actual values. For each entrance angle, two measurements at an observation angle of 0.2° were made, and the article was rotated between measurements by 90° in the plane normal to the line of light transmission. The sample was at a rotation angle of 0° when the set of grooves having an included angle of 88° 51' was parallel to the entrance angle plane.

Qualitative observation of the samples of the invention made from the lapped portion of the mold showed a marked increase in transmission over articles made from the non-lapped portion. The amount of transmission increased with increasing entrance angle, but there was little sensitivity to rotation angle or material identity. The quantitative results are in Table 1. The error in each normalized measurement is approximately 0.3.

The results show that a dependence of light transmission on rotation angle in control Run No. 2, similar to the dependence of retroreflected brightness on rotation angle taught by Hoopman (see U.S. Pat. No. 4,588,258 at FIG. 6 and column 5 line 59 to column 6 line 21). However, addition of non-retroreflective curved area, as in the 20% of total area of Run No. 16, substantially eliminates the angular dependence, especially at lower entrance angles. This suggests that only a relatively small amount of curved non-retroreflective area introduces an angular independence of transmitted brightness into an article exhibiting an angular dependence of retroreflected brightness.

TABLE 1

| | | | HIGH ANGULARITY ARTICLES | | | | | | | |
|---|---|---|---|---|---|---|---|---|---|---|
| | | | Normalized Light Transmission | | | | | | | |
| | | | Entrance Angle: | | | | | | | |
| | | | 0° | | 10° | | 25° | | 40° | |
| | Area | | Rotation Angle: | | | | | | | |
| Run No. | Turned | Material | 0° | 90° | 0° | 90° | 0° | 90° | 0° | 90° |
| 2 | 0% | PC | 18.0 | 17.8 | 18.9 | 34.0 | 24.8 | 58.5 | — | — |
| 16 | 20% | PC | 42.4 | 46.6 | 46.1 | 46.2 | 50.5 | 66.1 | 50.3 | 68.8 |
| 17 | 60% | PC | 73.0 | 72.2 | 73.3 | 73.5 | 74.8 | 78.4 | 74.4 | 75.2 |
| 18 | 80% | PC | 80.1 | 81.1 | 79.3 | 79.4 | 77.9 | 84.2 | 74.0 | 83.1 |

Material Code: PC is polycarbonate

EXAMPLE II

Flat separation surfaces were added to the wide angularity cube-corner elements taught in U.S. Pat. No. 4,588,258 (Hoopman) by two methods. In Run No. 1, retroreflective articles were formed from a nickel stamper plate which had been hand lapped to generate flat separation surfaces across the three groove bottoms. Except for the lapped flat surfaces, the stamper plate was unchanged from one that would produce the Hoopman element, i.e., the metal stamper used in control Run No. 2 of Example I. In Runs No. 8a and 8b, flats were ground into the surface of a nickel stamper mold prior to forming the retroreflective articles. Measurements of transmitted light intensity were made as in Example I and are shown in Table 2A.

Measurements of the sizes of the separation surfaces of the retroreflective articles were made with a toolmakers microscope having a positioning accuracy of 10 millionths of an inch (0.00025 mm) and an optical measurement accuracy of at most 50 millionths of an inch (0.0013 mm). For each different included base angle, measurements were made of the length (i.e., along a groove) of the opposite base edge of an element, and the width of the separation surface bounded by the same base edge. The width of a separation surface is the distance along a straight line drawn between the two base edges which define the separation surface, and perpendicular to the length of the groove. This line may lie on the separation surface itself (in the case of a flat surface), or it may span the depth of a groove (in the case of a concave curved surface), or it may pass through the surface (in the case of a convex curved surface). Separate sets of measurements of two different elements were made. The results are shown in Table 2B.

For comparison, a previously existing article having nonretroreflective regions between retroreflective elements is produced by Amerace Corporation, Signal Products Division, Niles, Ill. USA, and designated "STIMSONITE" High Performance Grade Sheeting. This product comprises retroreflective elements in which the base edges of the lateral faces of the elements form an isosceles triangle having included angles of 65 degrees, 65 degrees, and 50 degrees. Using the toolmakers microscope, four sets of similar measurements were made of a sample of the yellow version of this article (Product Number 30220). Separate sets of measurements of four different elements were made. The results are also shown in Table 2B.

Notable in the data of Table 2A is the approximately 72% increase in transmission of Run No. 1 over Run No. 2 at 0° entrance angle, from a normalized value of 18.0 to 31.1. The percentage increase is essentially the same for 90° rotation angle, from 17.8 to 30.6. By contrast, standard retroreflectivity measurements of each of these articles indicated only a 18.9% decrease in average retroreflected brightness at 0° entrance angle and 0.1° observation angle, from 1875 to 1521 candela/lux/square meter. (The brightness values represent the average of 24 measurements taken at 15° intervals of rotation angle.) This shows that the articles of this invention show only a minimal loss in retroreflectivity but a large increase in transparency.

TABLE 2A

HIGH ANGULARITY ARTICLES

| | | | Normalized Light Transmission | | | | | |
|---|---|---|---|---|---|---|---|---|
| | | | Entrance Angle: | | | | | |
| | | | 0° | | 10° | | 25° | |
| | Pattern | | Rotation Angle: | | | | | |
| Run No. | Type | Material | 0° | 90° | 0° | 90° | 0° | 90° |
| 2 | Non-lapped | PC | 18.0 | 17.8 | 18.9 | 34.0 | 24.8 | 58.5 |
| 1 | Lapped | PC | 31.1 | 30.6 | 32.0 | 43.0 | 35.5 | 62.0 |
| 8a | Surface ground | PC | 33.3 | 34.2 | 38.0 | 59.0 | 36.0 | 62.0 |
| 8b | Surface ground | PC | 51.4 | 54.2 | 54.0 | 68.0 | 50.0 | 69.0 |

Material Code: PC is polycarbonate

TABLE 2B

HIGH ANGULARITY AND COMPARISON ARTICLES
distances in thousandths of a millimeter

| | | | | Opposite Angle | | | |
|---|---|---|---|---|---|---|---|
| Run No. | Pattern Type | length | width | length/width | length | width | length/width |
| | | | 55° | | | 70° | |
| 2 | Non-lapped | 431.8 | 1.3 | 332 | 499.1 | 1.3 | 384 |
| 1 | Lapped | 400.1 | 22.0 | 18.2 | 439.4 | 34.3 | 12.8 |
| 8a | Surface ground | 428.0 | 34.3 | 12.5 | 442.0 | 38.7* | 11.4 |
| 8b | Surface ground | 285.8 | 50.8 | 5.6 | 353.1 | 92.7 | 3.8 |
| Comparison Article | | | 65° | | | 50° | |
| Amerace 30220 | | 252.1* | 10.2* | 24.7* | 215.3* | 5.1* | 42.2* |

*Indicates average of four measurements
All other values are averages of two measurements

EXAMPLE III

A portion of a full cube-corner mold was hand lapped to 50% of the pattern depth and used to mold polycarbonate (run 11) and acrylic (run 12) articles. Measurements of transmitted light intensity were made as in Example I and are shown in Table 3. The sample was at 0° rotation when one of the three identical grooves was parallel to the plane containing the entrance angle. For comparison, control measurements of light transmission through articles molded from a non-lapped portion of the mold were made also (Runs No. 7, 14, and 15).

TABLE 3

FULL CUBE CORNER ARTICLES

| | | | Normalized Light Transmission | | | | | |
|---|---|---|---|---|---|---|---|---|
| | | | Entrance Angle: | | | | | |
| | | | 0° | | 10° | | 25° | |
| | Pattern | | Rotation Angle: | | | | | |
| Run No. | Type | Material | 0° | 90° | 0° | 90° | 0° | 90° |
| 7 | Non-Lapped | PC | 14.1 | 14.7 | 22.0 | 22.1 | 38.0 | 32.0 |
| 14 | Non-Lapped | PC | 14.5 | 13.4 | 22.0 | 22.0 | 35.0 | 43.0 |
| 15 | Non-Lapped | A | 14.9 | 14.9 | 25.0 | 24.0 | 64.0 | 57.0 |
| 11 | Lapped | PC | 53.4 | 56.0 | 58.0 | 54.0 | 57.0 | 62.0 |

TABLE 3-continued
FULL CUBE CORNER ARTICLES

| | | | Normalized Light Transmission | | | | | |
|---|---|---|---|---|---|---|---|---|
| | | | Entrance Angle: | | | | | |
| | | | 0° | | 10° | | 25° | |
| | Pattern | | Rotation Angle: | | | | | |
| Run No. | Type | Material | 0° | 90° | 0° | 90° | 0° | 90° |
| 12 | Lapped | A | 56.8 | 58.0 | 63.0 | 59.0 | 74.0 | 70.0 |

Note: Run 14 is a repeat of Run 7
Material Code: PC is polycarbonate
A is acrylic

EXAMPLE IV

A portion of a "60-60-60" triangular base cube-corner mold was hand lapped to produce flat separation surfaces, and used to mold polycarbonate and acrylic articles. Measurements were made as in Example I and are shown in Table 4 (Run No. 10). The sample was at 0° rotation when one of the three identical sets of grooves was parallel to the entrance angle plane. For comparison, control measurements of light transmission through articles molded from a non-lapped portion of the mold were also made. The results are also shown in Table 4 (Run No. 3).

EXAMPLE V

Flat separation surfaces were added to an article comprising the high entrance angle prismatic elements taught in U.S. Pat. No. 4,349,598 (White). Measurements of transmitted light intensity were made as in Example I and are shown in Table 4 (Run No. 13). The sample was at 0° rotation when the base edges of the rectangular lateral faces of the prismatic elements were parallel to the entrance angle plane.

TABLE 4
TRIANGULAR BASE AND HIGH ENTRANCE ANGLE ARTICLES

| | | | Normalized Light Transmission | | | | | |
|---|---|---|---|---|---|---|---|---|
| | | | Entrance Angle: | | | | | |
| | | | 0° | | 10° | | 25° | |
| | Pattern | | Rotation Angle: | | | | | |
| Run No. | Type | Material | 0° | 90° | 0° | 90° | 0° | 90° |
| 3 | Non-Lapped | A | 15.5 | 14.8 | 20.0 | 18.2 | 63.7 | 48.3 |
| 10 | Lapped | PC | 36.7 | 37.4 | 41.0 | 41.0 | 45.0 | 43.0 |
| 13 | High Entrance Angle | PC | 13.6 | 16.0 | 67.0 | 27.0 | 72.0 | 14.0 |

Material Code: PC is polycarbonate
A is acrylic

I claim:

1. A partially transparent retroreflective article formed by three intersecting sets of parallel grooves, comprising a base, prismatic elements having lateral faces intersecting the base at base edges of a base edge length, and separation surfaces on the base, in which:
   (a) each set of grooves has a groove side angle that is constant for that set;
   (b) the separation surfaces
      are transparent,
      are bounded by the base edges of the lateral faces of the prismatic elements,
      lie between the prismatic elements in at least one of the grooves,
      have, taken at any point along any groove in which they lay, curved cross sections taken across that groove; and
   (c) the separation surfaces have ratios of base edge length to separation surface width, as measured at any point along any groove, which do not exceed 24.7.

2. The article of claim 1, in which the base edges of the lateral faces of the elements form substantially isosceles triangles.

3. The article of claim 2, in which the base edges of the lateral faces of the elements form triangles having included angles of substantially 65 degrees, 65 degrees, and 50 degrees.

4. The article of claim 2, in which the prismatic elements are rotated 180° with respect to one another, the lateral faces of each element are mutually perpendicular and defined at their bases by linear base edges that lie in a common plane, and an optical axis of each element of a pair of elements is tilted towards one edge of that element.

5. The article of claim 1, in which the base edges of the lateral faces of the elements form substantially equilateral triangles.

6. The article of claim 1, in which a lateral face of at least one prismatic element is specularly reflective.

7. A polymeric sheet material having on one large area side an array of prismatic elements and separation surfaces as defined in claim 1.

8. An internally illuminated sign comprising an enclosure transmissive to light on at least one side, designated the front side, and the retroreflective sheet of claim 7 positioned to reflect light incident on the front of the sign.

9. A partially transparent retroreflective article formed by three intersecting sets of parallel grooves, comprising a base, prismatic elements having lateral faces intersecting the base at base edges of a base edge length, and separation surfaces on the base, in which:
   (a) each set of grooves has a groove side angle that is constant for that set;
   (b) the separation surfaces
      are transparent,
      are bounded by the base edges of the lateral faces of the prismatic elements, lie between the prismatic elements in at least one of the grooves, have, taken at any point along any groove in which they lay, flat cross sections taken across that groove; and (c) the separation surfaces have ratios of base edge length to separation surface width, as measured at any point along any groove at which the cross section is flat, which do not exceed 24.7.

10. The article of claim 9, in which the separation surfaces are at least 0.0051 mm in width at any point along any groove at which the cross section is flat.

11. The article of claim 9, in which the base edges of the lateral faces of the elements form substantially isosceles triangles.

12. The article of claim 11, in which the base edges of the lateral faces of the elements form triangles having included angles of substantially 65 degrees, 65 degrees, and 50 degrees.

13. The article of claim 9, in which the base edges of the lateral faces of the elements form substantially equilateral triangles.

14. The article of claim 9, in which a lateral face of at least one prismatic element is specularly reflective.

15. A polymeric sheet material having on one large area side an array of prismatic elements and separation surfaces as defined in claim 9.

16. An internally illuminated sign comprising an enclosure transmissive to light on at least one side, designated the front side, and the retroreflective sheet of claim 15 positioned to reflect light incident on the front of the sign.

* * * * *

UNITED STATES PATENT AND TRADEMARK OFFICE
CERTIFICATE OF CORRECTION

PATENT NO. : 5,122,902
DATED : June 16, 1992
INVENTOR(S) : Gerald M. Benson

It is certified that error appears in the above-identified patent and that said Letters Patent is hereby corrected as shown below:

Column 4, line 60, delete "present Truncated" and insert --present. Truncated--.

Column 5, line 53, delete "41b" and insert --41h--.

Column 9, line 31, delete "36° 36' and insert --60° 36'--.

Signed and Sealed this

Tenth Day of August, 1993

Attest:

MICHAEL K. KIRK

Attesting Officer

Acting Commissioner of Patents and Trademarks